United States Patent
Kausik et al.

(10) Patent No.: US 6,263,446 B1
(45) Date of Patent: Jul. 17, 2001

(54) METHOD AND APPARATUS FOR SECURE DISTRIBUTION OF AUTHENTICATION CREDENTIALS TO ROAMING USERS

(75) Inventors: Balas Natarajan Kausik, Los Gatos; Rammohan Varadarajan, Cupertino, both of CA (US)

(73) Assignee: Arcot Systems, Inc., Santa Clara, CA (US)

(*) Notice: Subject to any disclaimer, the term of this patent is extended or adjusted under 35 U.S.C. 154(b) by 0 days.

(21) Appl. No.: 09/196,430

(22) Filed: Nov. 19, 1998

Related U.S. Application Data

(63) Continuation-in-part of application No. 08/996,758, filed on Dec. 23, 1997.

(51) Int. Cl.[7] .................................................. G06F 11/30
(52) U.S. Cl. ..................... 713/201; 713/153; 713/155; 713/156; 713/159; 380/259; 380/264; 380/282; 380/286; 705/56; 705/64; 705/65; 705/66; 705/67; 705/73
(58) Field of Search .................... 380/259, 264, 380/282, 286; 705/56, 64, 65, 66, 67, 71, 72, 73, 76; 713/153, 155, 156, 159, 201

(56) References Cited

U.S. PATENT DOCUMENTS

| | | | |
|---|---|---|---|
| 3,798,605 | * | 3/1974 | Feistel ............................... 340/172.5 |
| 5,148,479 | * | 9/1992 | Bird et al. .............................. 380/23 |
| 5,475,756 | * | 12/1995 | Merritt ................................... 380/24 |
| 5,491,752 | * | 2/1996 | Kaufman et al. ....................... 380/30 |
| 5,668,876 | * | 9/1997 | Falk et al. .............................. 380/25 |
| 5,689,566 | * | 11/1997 | Nguyen ................................. 380/25 |
| 5,757,918 | * | 5/1998 | Hopkins ................................. 380/25 |
| 5,764,890 | * | 6/1998 | Glasser et al. .................. 395/188.01 |
| 5,778,065 | * | 7/1998 | Hauser et al. ......................... 380/21 |

\* cited by examiner

*Primary Examiner*—Tod Swann
*Assistant Examiner*—Paul E. Callahan
(74) *Attorney, Agent, or Firm*—Joseph Yang; Skadden, Arps, Slate, Meagher & Flom LLP

(57) ABSTRACT

A roaming user needing an his authentication credential (e.g., private key) to access a computer server to perform an electronic transaction may obtain the authentication credential in an on-demand fashion from a credential server accessible to the user over a computer network. In this way, the user is free to roam on the network without having to physically carry his authentication credential. Access to the credential may be protected by one or more challenge-response protocols involving simple shared secrets, shared secrets with one-to-one hashing, or biometric methods such as fingerprint recognition. If camouflaging is used to protect the authentication credential, decamouflaging may be performed either at the credential server or at the user's computer.

52 Claims, 3 Drawing Sheets

METHOD AND APPARATUS FOR SECURE DISTRIBUTION OF AUTHENTICATION CREDENTIALS TO ROAMING USERS

CROSS-REFERENCE TO RELATED APPLICATIONS

This application is a Continuation-in-Part of pending U.S. patent application Ser. No. 08/996,758 filed Dec. 23, 1997.

BACKGROUND OF THE INVENTION

In networked computer deployments, users of client computers are required to authenticate themselves to server computers for applications such as electronic mail, accessing privileged or confidential information, purchasing goods or services, and many other electronic commerce transactions. When the information involved is of relatively low value, it may be sufficient for the user to authenticate himself with a simple password. However, when the information is of high value, or when the data network is unsecured, simple passwords are insufficient to control access effectively. For example, when computers are accessed across the Internet, passwords are easy to capture by filtering packets as they traverse the network. Alternatively, passwords can be guessed or "cracked" by intelligent trials, since passwords are often six or fewer characters. In brief, the convenience of passwords makes them easy to break—if they are sufficiently easy for the user to remember, they are sufficiently easy for the hacker to guess.

To overcome the insecurity of the password, alternative technologies have been developed. One such technology is asymmetric key cryptography. In this technology, each user has two keys, a private key and a public key. The user performs a cryptographic operation (e.g., an encryption or a digital signature) on a digital quantity using his private key, such that the quantity may be authenticated by a verifier having access only to the user's public key. The private key therefore serves as the user's authentication credential. That is, the verifier need not know the user's private key in order to authenticate the user. Because the public key may be widely disseminated while the private key remains confidential, strong authentication is provided with enhanced security. Private keys are generally too long and complex for the user to memorize, and are therefore usually stored in software or hardware tokens, and interfaced with computers prior to use.

One such software token is the so-called software wallet, in which the private key is encrypted with a password or other access-controlled datum. In such software wallets, an intruder is not deterred from repeatedly trying passwords, in an exhaustive manner, until he recovers the private key. This poses analogous security risks to the simple password schemes described above. In addition, the software wallet is stored on a user's computer, which may be inconvenient if the user needs to freely roam from one location to another.

In contrast to software wallets, hardware tokens such as smart cards are more secure, and can be conveniently carried as the user roams. In a typical hardware smart card, the private key is stored in hardware, and protected by a watchdog chip that allows the user to access the private key, should he enter the correct password that unlocks the smart card. The smart card can even be configured so that, if a hacker attempts to guess passwords, the card locks up after a small number of successive missed attempts. The disadvantages of hardware token are: (1) roaming is restricted to locations where the appropriate token reader hardware is installed; (2) hardware tokens are expensive in contrast to software tokens; (3) hardware tokens must be physically carried wherever the user wishes to roam; and (4) hardware tokens are often lost, misplaced, or stolen.

Thus, while hardware token systems offer increased security, they have several disadvantages compared to software based systems. It would, therefore, be desirable to have a system that combines the best features of both hardware and software based systems.

SUMMARY OF THE INVENTION

The present invention discloses a method and apparatus for the on-demand delivery of authentication credentials to roaming users. Credentials are stored, delivered and transmitted in software, obviating the need for additional hardware. In a basic embodiment of the system, a user can demand his credential at will, upon providing proof of identity in the form of shared secret(s) that he has previously escrowed with the credential server. The shared secret may be chosen by the user, and could be easily remembered secrets such as: mother's maiden name, third grade teacher, etc. The user will respond to challenges from the server via a challenge-response protocol, with the server demanding correct answers to such questions prior to releasing the user's credentials. In another embodiment of the invention, a user's authentication credential can be stored on the server protected by a simple shared secret scheme such as a password, a biometric authentication scheme based on a fingerprint or retinal image, or a one-to-one hashed shared secret. In yet another embodiment of the invention, the user interacts with the server via a cryptographically camouflaged challenge-response protocol. In particular, if the user responds correctly to the server's challenges, the user will receive his authentication credentials. However, if the user responds incorrectly, such as might be the case with a hacker trying to break the system, the user will receive plausible and well-formed but invalid credentials. Furthermore, the authentication credential itself could be encrypted or camouflaged with an additional secret that is known only to the user. An authentication credential is said to be in cryptographically camouflaged form when it is embedded among many pieces of similar (pseudo-valid) data. These data are sufficiently different that the user can locate the correct piece without any difficulty, using a shared secret that he can remember. However, the pieces of data are also sufficiently alike that an intruder will find all of them equally plausible. Such a cryptographically camouflaged authentication credential can be provided to the user in either camouflaged or decamouflaged form that is, the decamouflaging can be performed at either the credential server or at the user's computer. The various embodiments of the invention described above provide one or more or the following advantages: No additional hardware is required for deployment. This is in contrast with hardware tokens such as smart cards where cards and card readers need to deployed in a widespread fashion.

(1) High user convenience. Roaming users need not carry tokens with them, but can demand them as required.

(2) Low administrative overhead. Users who have lost, misplaced or forgotten tokens do not require administrative intervention.

(3) Rapid deployment rate. Soft credentials with roaming access can be deployed rapidly, since they are intuitive to use and require little user/administrator training.

(4) Enhanced security over purely one-factor systems.

DETAILED DESCRIPTION OF THE INVENTION

We now describe various exemplary embodiments of the invention using the exemplary context of a user operating a web browser to access one or more remote server, whereby the user can freely roam about the Internet while still maintaining access to his authentication credential. Those skilled in the art will recognize that the invention is applicable to other client-server environments as well, including but not limited to databases, medical client stations, and financial trading stations. Furthermore, the network environment need not be the Internet, but could be an intranet or indeed any distributed computer network.

Figure 1:
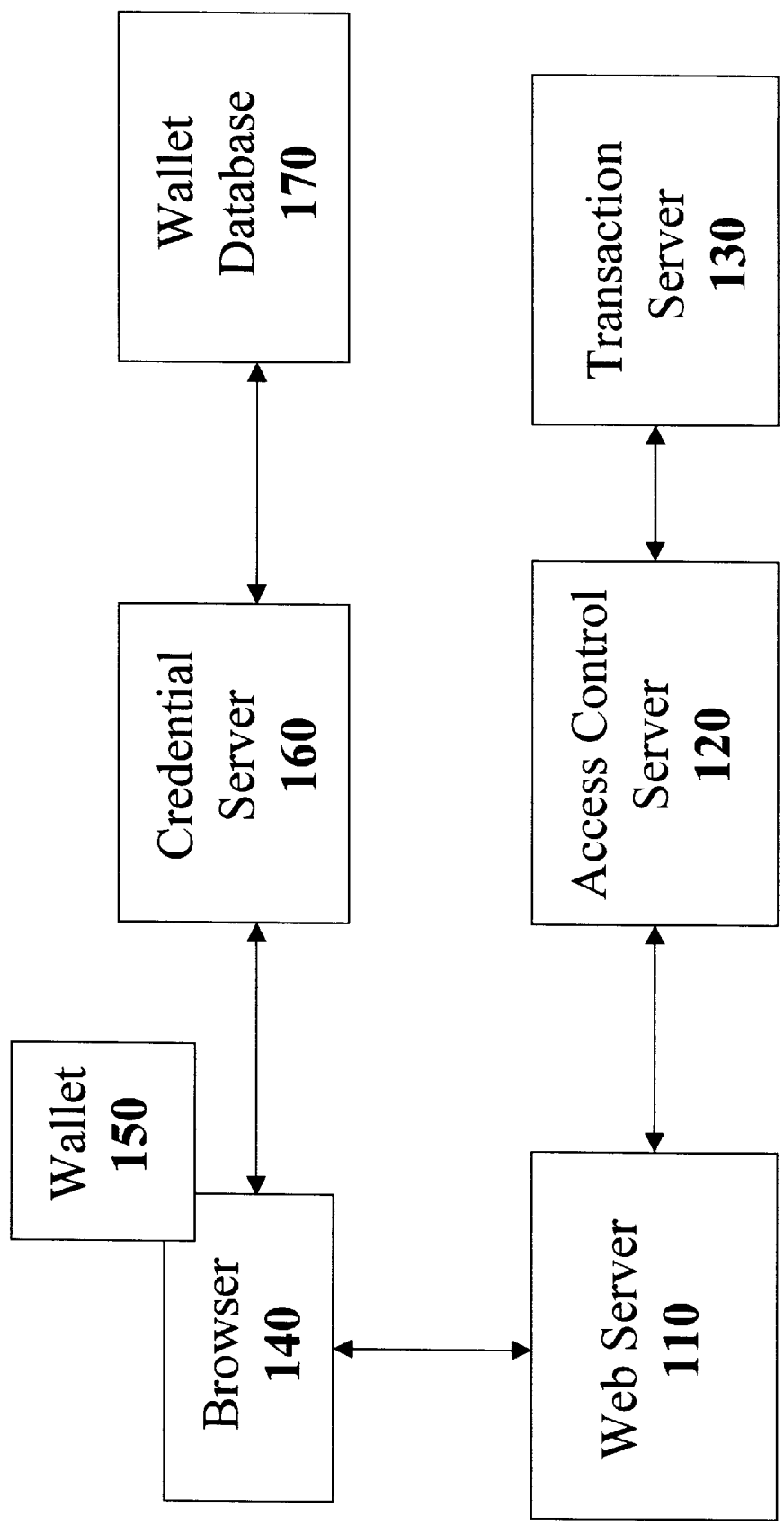
FIG. 1 illustrates an exemplary embodiment of the invention in which a user accesses a web server to conduct an electronic transaction with a transaction server protected by an access control server.

Referring now to FIG. 1, a user at Browser 140 wishes to access a Web Server 110 to conduct an electronic transaction. Web Server 110 is, in turn, safeguarded by Access Control Server 120, which prevents unauthorized access to Transaction Server 130. For example, Web Server 110 might be a company's home page, Access Control Server 120 might be a firewall, and Transaction Server 130 might contain proprietary company data that the user wishes to access. In yet another example, Access Control Server 120 might be a membership or credit/payment verification system, and Transaction Server 130 might be a back-end shipping/delivery system. Those skilled in the art will appreciate that any or all of servers 110, 120 and 130 may be combined into a single server, that there may be more additional servers performing other specialized functions, that any of these servers may be co-located or widely distributed, and so forth. Similarly, the electronic transaction may be of virtually any type including, but not limited to, secure electronic mail, accessing privileged or confidential information, and purchasing electronic or physical goods or services.

Before accessing the Transaction Server 130 to perform the electronic transaction, the user first needs to authenticate himself to Access Control Server 120. As mentioned in the Background of the Invention, the user typically authenticates himself by using his private key to perform a cryptographic operation on a challenge sent by the Access Control Server 120. This cryptographic operation might be a simple encryption, a hash followed by encryption (commonly referred to as a digital signature), or still other protocols that are well known to those skilled in the art. Of course, in lower security applications, the authentication credential might be a simple password. Private key, password and other authentication credentials are well known to those skilled in the art, and need not be described in detail here. For examples thereof, the reader is referred to well-known, standard texts as *Applied Cryptography* (Bruce Schneier, Second Edition, 1996, pp. 101–112 & 548–549) for details.

No matter what the authentication credential or protocol, if the Access Control Server 120 authenticates the user, the user is subsequently allowed to access the Transaction Server 140. The present invention provides a method and apparatus for providing the authentication credential, on demand, to a user who wishes to be able to access servers 110, 120 and/or 130 from a variety of Browsers 140 (the so-called "roaming user").

This on-demand roaming capability is provided by a Credential Server 160 that downloads the authentication credential (e.g., private key) to the user at Browser 140 via a software Wallet 150. As used herein, Wallet 150 need only serve as a basic container for the authentication credential. As such, it could be considered to be simply the data structure in which the authentication credential is embodied, or it could be a more sophisticated container having the capability to handle other user-owned items such as a digital certificate or digital currency (including, without limitation, electronic cash or scrip). In a basic embodiment of the invention, Credential Server 160 is embodied as a web server. The user points his Browser 140 to the Credential Server, which sends the user a challenge in the form of a shared secret that has previously been associated with the user during a set-up phase. This shared secret might be of the following exemplary forms:

| Question: | Mother's maiden name? | Answer: | Jones |
|---|---|---|---|
| Question: | Dog's name? | Answer: | Lucky |
| Question: | Favorite sport? | Answer: | Football |
| Question: | PIN? | Answer: | PIN |

The actual number of questions can vary from credential server to credential server, as dictated by their respective security policies. If the user provides the correct answer(s), the Credential Server 160 obtains the user's wallet from a Wallet Database 170 (which may or may not be part of Credential Server 160) and provides the wallet to the user at Browser 140. In an alternative embodiment, the wallet, or a part thereof, could be provided directly to any of servers 110, 120 & 130.

In either of the foregoing, the wallet could be installed either: 1) in the memory space of the software program, and/or subsequently 2) onto the hard drive or other physical memory of the computer. If only the former, the authentication credential would be destroyed when the session is ended. If the latter, the authentication credential could be available for use across multiple sessions on that particular computer. In either event, as the user roams to another computer, the process can be repeated to provide on-demand access to the needed authentication credential without the requirement of a physical token (even though the invention could also be used in conjunction with a physical token, as desired).

The foregoing illustrates the use of so-called shared secrets, whereby the user and the server both share copies of information required to access the system. Of course, the invention is not limited to such simple protocols which, by their nature, are subject to abuse by a dishonest server. For example, zero knowledge proofs, whereby the user can prove to the server that he knows his mother's maiden name (or other secret information) without actually revealing the name to the server, can also be used. As a simple example, the user's private key itself could be used in this fashion, for a verifier need only know the corresponding public key to verify the private key. The principles and implementations of zero knowledge proofs are well known to those skilled in the art and need not be described here. The reader is referred to well-known, standard texts such as *Applied Cryptography*, supra, for details.

Figure 2:
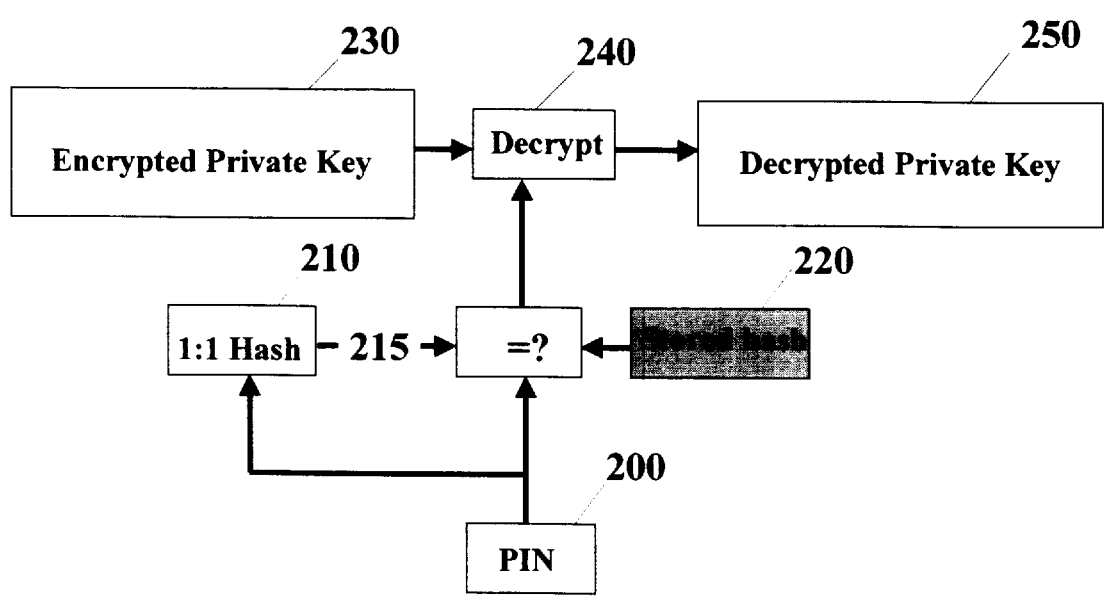
FIG. 2 illustrates an exemplary embodiment of a wallet in which a private key is protected by a PIN.

In one embodiment of the invention, the wallet might itself be protected by a shared secret. For example, FIG. 2 shows an exemplary embodiment of a wallet in which a private key is protected by a PIN. The PIN (more generally, a shared secret) might be the shared secret transmitted by the user to the Credential Server 160, as discussed previously, and the private key (more generally, the authentication credential) in the wallet might be decrypted by Credential Server 160 and provided in the clear to the user at Browser 140. Alternatively, the entire wallet (including the authentication credential in encrypted form) might be provided to the user, for the user to decrypt locally at Browser 140. With either approach, the process of decrypting the PIN-protected authentication credential as follows. The user enters a PIN 200 (more generally, an access code) to unlock the wallet, and the PIN is passed through a one-to-one hash function 210. The hash function may also include a salt value or other security-enhancing feature, as will be appreciated by persons skilled in the art. The hashed value 215 of the entered PIN is compared with a stored hash value 220, which is the hashed value of the correct PIN. If the two hash values agree, the PIN is passed to decryption module 240. The private key which has been encrypted (with the correct PIN as the encryption key) and stored in field 230, is decrypted by decryption module 240, which is typically DES or some other cryptographic function such as, for example, triple-DES, IDEA or BLOWFISH. Hence, the decrypted private key 250 is released for use.

The cryptographic operations of computing the hash(es) and decrypting the stored hash may be implemented using one or more cryptographic logic (e.g., software or hardware) modules, and the correct hash value and private key may be stored in protected data fields or other forms of memory (e.g., read from ROM, from computer-readable media, etc.). A typical key wallet would also include input and output logic for receiving candidate PINs and outputting decrypted private keys, as well as logic for management, viewing, copying, and handling of keys and other data.

The one-to-one nature of the hash function ensures that the correct PIN and only the correct PIN will unlock the key wallet. Unfortunately, it also allows a malicious hacker to guess the complete PIN via a brute force search. For example, he might write a program that simply checks all six-digit PIN codes on the key wallet. If he gets a copy of the key wallet, he can carry out this attack on his computer, completely undetected and in an automated fashion, in a matter of a few minutes.

To resist the PIN hash attack, another embodiment of the invention uses a technique called cryptographic camouflaging to provide even greater security in connection with the authentication credential. Cryptographic camouflaging is described is summary form below with respect to FIG. 3; for full details, the reader may refer to co-pending U.S. patent application Ser. No. 08/996,758, which is incorporated herein by reference.

Figure 3:
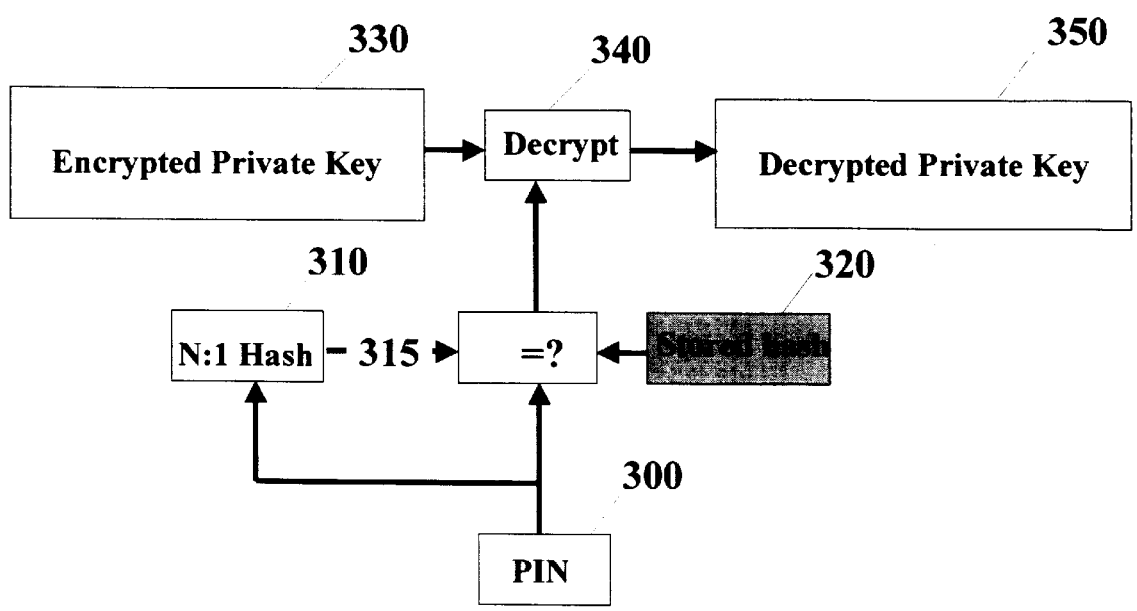
FIG. 3 illustrates an exemplary embodiment in which the wallet of FIG. 2 is protected by a form of cryptographic camouflaging.

Referring now to FIG. 3, the authentication credential (e.g., private key) is protected via an access code as in FIG. 2. However, the one-to-one hash is replaced with a many-to-one hash, i.e., a hash in which many inputs produce (i.e., regenerate) the same hashed output. In an exemplary implementation, the many-to-one hash function 310 might hash six-digit codes to two-digit hash values. As in the conventional key wallet, the hashed value 315 of the entered PIN 300 is compared with the stored hash value 320, which is the hashed value of the correct PIN. If the two hash values agree, the key wallet opens. The private key is again stored encrypted in field 330 of the key wallet, with the correct PIN as the encryption key. When the correct PIN is entered, the stored encrypted key is decrypted and the correct private key 350 is released for use. However, since the hash function is many-to-one, there will be many different entered PINs that will satisfy the hash challenge to open the key wallet. (PINs that hash to the same hash value as the correct PIN, including the correct PIN, are referred to herein as pseudo-valid PINs.) For example, if the hash function hashes six-digit codes to two-digit hash values, there will be 10,000 six-digit pseudo-valid PINs that will open the key wallet, out of a total of 1,000,000 possible six-digit codes. Pseudo-valid PINs will all be passed to the decryption module 340 to decrypt the stored encrypted key to produce a candidate private key. However, all but one of these candidate private keys will be incorrect decryptions of the stored (correct) private key. Only when the entered PIN is the correct PIN will the correct private key be recovered.

Preferably, the many-to-one hash function above should be chosen to be a good hash. For example, and without limitation, MD5 and SHA are well-known good hash functions. Good hash functions are one means to substantially uniformly distribute the pseudo-valid PINs in the space of all possible PINs. For example, consider a hash function from six-digit codes to two-digit hash values. Of the 1,000,000 possible input values, 10,000 will be pseudo-valid PINs. If the hash function is a good hash, these values will be substantially uniformly distributed. In particular, one in a hundred PINs will be pseudo-valid, and these will be effectively randomly distributed. Specifically, the chances are $1/100$ that if the user makes a typographical error in entering the correct PIN, then the resulting PIN will be a pseudo-valid PIN.

Another possible embodiment uses a weak hash, i.e., one which results in clustering of pseudo-valid PINs, whereby an intruder who guesses one pseudo-valid PIN will more easily find others. A legitimate user making a series of 1-digit typographical errors would also get a sequence of pseudo-valid PINs and, if the system accepting the private key or messages encrypted thereby has an alarm-or-disable-upon-repeated-failure feature, this would inadvertently lock out the legitimate user. Thus a weak hash is typically disfavored over the good hash. Nevertheless, there may be some applications where a weak hash provides certain characteristics such as computational efficiency and ease of implementation that are advantageous for specialized applications.

The foregoing paragraphs describes techniques for further protecting the wallet, either with a one-to-one or many-to-one hash. It will be appreciated by those skilled in the art that the decryption processes 200–250 and 300–350 (e.g., cryptographic decamouflaging) may be performed at either the user's computer or at the Credential Server 160. In the former case, the wallet is downloaded to the user in decrypted form, while in the latter, the wallet is decrypted at the Credential Server 160 before downloading to the user.

More generally, it will also be appreciated that the various challenge-response protocols described to this point (e.g., the simple shared secret; the biometric method such as fingerprint recognition; the one-to-one hashed secret of FIG. 2; and the many-to-one hashed secret of FIG. 3) can be used at either the Credential Server 160 or at Browser 140, and that such use can occur in any combination or permutation. For example, with minimal security, the Credential Server 160 could be accessed by a simple shared secret, and the wallet could be downloaded to the user in the clear. Alternatively, the wallet could be further protected by a one-to-one or many-to-one (i.e., cryptographically camouflaged) hashed shared secret and decrypted at the Credential Server in response to the user's responding to the appropriate challenge-response protocol. The decrypted (or, in the case of the many-to-one hash, the decamouflaged)

wallet would then be downloaded to the user in the clear. For greater security, the wallet could be downloaded to the user in camouflaged form, with the decamouflaging occurring at the user's computer. For still greater security, a one-to-one or many-to-one hash process could replace the simple shared secret for the initial server access. In general, then, the one-to-one hash or many-to-one hash could be deployed at the initial server access stage, while any of the simple shared secret, one-to-one hash, many-to-one hash techniques could be employed at the subsequent wallet downloading stage. Because of these and other variations that will be understood to those skilled in the art, it is therefore intended that the scope of the invention be not limited to the particular embodiments disclosed herein, but rather to the full breadth of the claims appended hereto.

What is claimed is:

1. A computer-implemented method for obtaining, in a networked environment, an authentication credential usable to conduct an electronic transaction, comprising:
    (a) accessing, over a network, a server to request therefrom a predetermined authentication credential, said authentication credential:
       (i) in existence at said server prior to said request therefor,
       (ii) uniquely identifying a requestor thereof, and
       (iii) suitable for use in conducting an electronic transaction;
    (b) receiving, from said server, a challenge soliciting a predetermined response associated with a holder of said authentication credential;
    (c) transmitting an answer to said challenge; and
    (d) in response to a determination by said server that said answer satisfies said challenge, receiving said authentication credential from said server;
said method being operable in a repeatable, on-demand manner by said requestor from a plurality of requestor locations.

2. The method of claim 1 where said authentication credential includes a secret credential of said requestor.

3. The method of claim 2 where said secret credential is a private key.

4. The method of claim 2 further comprising:
    (e) using said authentication credential to conduct said electronic transaction; and
    (f) deleting said credential from said requestor's computing device.

5. The method of claim 2 where said requestor's computing device includes a web browser, and said network is a distributed computer network.

6. The method of claim 2 where said requestor's computing device includes a digital wallet.

7. The method of claim 2 where said response includes a shared secret between said server and said requestor.

8. The method of claim 1 further comprising:
    (e) using said authentication credential to conduct said electronic transaction; and
    (f) deleting said credential from said requestor's computing device.

9. The method of claim 8 where said authentication credential includes a private key of said requestor.

10. The method of claim 1 where said received authentication credential is in cryptographically camouflaged form.

11. The method of claim 10 where said authentication credential is encrypted under an access code, and further comprising:
    (i) receiving from said requestor a candidate access code;
    (ii) verifying that said candidate access code belongs to a family of pseudo-valid responses; and
    (iii) using said pseudo-valid candidate access code to decrypt said stored authentication credential.

12. The method of claim 11 where said pseudo-valid responses have the characteristic of being hashable to the same output as said access code.

13. The method of claim 12 where said authentication credential includes a private key of said requestor.

14. The method of claim 10 where said authentication credential includes a secret credential of said requestor.

15. The method of claim 10 further comprising the steps of:
    (e) using said authentication credential to conduct said electronic transaction; and
    (f) deleting said credential from said requestor's computing device.

16. The method of claim 1 where said challenge and said response are members of a zero knowledge proof protocol.

17. The method of claim 1 where said steps (b) and (c) are part of a cryptographic camouflage challenge-response protocol.

18. The method of claim 1 further comprising downloading a digital currency from said server along with said authentication credential.

19. An apparatus for obtaining, in a networked environment, an authentication credential usable to conduct an electronic transaction, comprising:
    (a) a network interface configured to:
       (i) access, over a network, a server to request therefrom a predetermined authentication credential, said authentication credential:
          (A) in existence at said server prior to said request therefor,
          (B) uniquely identifying a requestor thereof, and
          (C) suitable for use in conducting an electronic transaction, and
       (ii) receive, from the server, a challenge soliciting a predetermined response associated with said requestor of said authentication credential;
    (b) an user interface configured to receive, from said requestor, an answer to said challenge;
    (c) said network interface configured to receive said authentication credential in response to a determination by said server that said answer satisfies said challenge; and
    (d) a memory configured to store said authentication credential at said requestor's computing device;
said apparatus being usable by said requestor to obtain repeated, on-demand access from a plurality of requestor locations.

20. The apparatus of claim 19 wherein said authentication credential includes a secret credential of said requestor.

21. The apparatus of claim 20 wherein said secret credential is a private key.

22. The apparatus of claim 19 configured for use as a web browser, and wherein said network is a distributed computer network.

23. The apparatus of claim 19 configured for use as a digital wallet.

24. The apparatus of claim 19 wherein said server is configured to store said authentication credential in cryptographically camouflaged form.

25. The apparatus of claim 24 wherein:
    (i) said authentication credential is encrypted under an access code;

(ii) said user interface is configured to receive, from said requestor, a candidate access code; and (iii) further comprising cryptographic logic configured to:

(iv) verify that said candidate access code belongs to a family of pseudo-valid responses; and (v) use said pseudo-valid candidate access code to decrypt said stored authentication credential.

26. The apparatus of claim 25 wherein said pseudo-valid responses have the characteristic of being hashable to the same output as said access code.

27. The apparatus of claim 26 wherein said authentication credential includes a private key of said requestor.

28. The apparatus of claim 19 wherein said challenge and said predetermined response are part of a cryptographic camouflage challenge-response protocol.

29. The apparatus of claim 24 wherein said authentication credential includes a secret credential of said requestor.

30. A computer-implemented method for providing, in a networked environment, an authentication credential usable to conduct an electronic transaction, comprising:

(a) receiving from a requestor, over a network, a request for a predetermined authentication credential, said authentication credential:

(i) in existence at said server prior to said request therefor, (ii) uniquely identifying a requestor thereof, and (iii) suitable for use in conducting an electronic transaction;

(b) transmitting, to said requestor, a challenge soliciting a predetermined response associated with said requestor;

(c) receiving an answer to said challenge;

(d) determining that said answer satisfies said challenge; and (e) transmitting said authentication credential for said requestor;

said method being operable to process repeated, on-demand authentication credential requests by said requestor at a plurality of requestor locations.

31. The method of claim 30 where said authentication credential includes a secret credential of said requestor.

32. The method of claim 31 where said secret credential is a private key.

33. The method of claim 31 where said requestor is at a web browser, and said network is a distributed computer network.

34. The method of claim 31 where said transmitting is to a digital wallet of said requestor.

35. The method of claim 31 where said response includes a shared secret between said server and said requestor.

36. The method of claim 30 where said server is configured to store said authentication credential in cryptographically camouflaged form.

37. The method of claim 36 where said authentication credential is encrypted under an access code, and where said determining that said answer satisfies said challenge includes:

(i) verifying that said answer belongs to a family of pseudo-valid responses; and (ii) using said response to decrypt said stored authentication credential.

38. The method of claim 37 where said pseudo-valid responses have the characteristic of being hashable to the same output as said access code.

39. The method of claim 38 where said authentication credential includes a private key of said requestor.

40. The method of claim 36 where said authentication credential includes a secret credential of said requestor.

41. The method of claim 36 where said step (e) includes transmitting said authentication credential to said requestor in cryptographically camouflaged form for cryptographic decamouflaging by said requestor.

42. The method of claim 30 further comprising sending a digital currency to said requestor along with said authentication credential.

43. An apparatus for providing, in a networked environment, an authentication credential usable to conduct an electronic transaction, comprising:

(a) a network interface configured to:

(i) receive from a requestor, over a network, a request for a predetermined authentication credential, said authentication credential:

(A) in existence at said apparatus prior to said request therefor;

(B) uniquely identifying a requestor thereof; and (C) suitable for use in conducting an electronic transaction, (ii) transmit a challenge soliciting a predetermined response associated with said requestor, and (iii) receive, from said holder, an answer to said challenge;

(b) logic configured to determine whether said answer satisfies said challenge; and (c) a memory configured to store said authentication credential to be released for said requestor;

said apparatus being operable to process repeated, on-demand authentication credential requests by said requestor at a plurality of requestor locations.

44. The apparatus of claim 43 wherein said authentication credential includes a secret credential of said requestor.

45. The apparatus of claim 44 wherein said secret credential is a private key.

46. The apparatus of claim 44 wherein said response includes a shared secret between said server and said requestor.

47. The apparatus of claim 43 wherein said server is configured to store said authentication credential in cryptographically camouflaged form.

48. The apparatus of claim 47 wherein said authentication credential is encrypted under an access code, and where said logic to determine whether said answer satisfies said challenge includes:

(i) cryptographic logic for verifying that said answer belongs to a family of pseudo-valid responses; and (ii) cryptographic logic for using said answer to decrypt said stored authentication credential.

49. The apparatus of claim 48 where said pseudo-valid responses have the characteristic of being hashable to the same output as said access code.

50. The apparatus of claim 49 where said authentication credential includes a private key of said requestor.

51. The apparatus of claim 47 wherein said network interface is configured to release said authentication credential to said requestor in cryptographically camouflaged form for cryptographic decamouflaging by said requestor.

52. The apparatus of claim 47 wherein said authentication credential includes a secret credential of said user.

* * * * *

UNITED STATES PATENT AND TRADEMARK OFFICE
CERTIFICATE OF CORRECTION

PATENT NO. : 6,263,446 B1  
DATED : July 17, 2001  
INVENTOR(S) : Kausik et al.

Page 1 of 1

It is certified that error appears in the above-identified patent and that said Letters Patent is hereby corrected as shown below:

<u>Title page,</u>
ABSTRACT,
Line 1, delete "his."

Signed and Sealed this

Twenty-ninth Day of January, 2002

Attest:

Attesting Officer

JAMES E. ROGAN
*Director of the United States Patent and Trademark Office*